United States Patent [19]
Beekhuis, Jr.

[11] 3,946,558
[45] Mar. 30, 1976

[54] EXHAUST SYSTEM AND METHOD

[76] Inventor: William H. Beekhuis, Jr., 27686 Natoma Road, Los Altos Hills, Calif. 94022

[22] Filed: Aug. 6, 1973

[21] Appl. No.: 386,059

[52] U.S. Cl. ............... 60/274; 60/278; 60/282; 60/305; 60/312
[51] Int. Cl.² .......................... F02B 75/10
[58] Field of Search ............ 60/274, 282, 278, 279, 60/312, 314, 304, 305, 317, 319; 181/43

[56] References Cited
UNITED STATES PATENTS

| | | | |
|---|---|---|---|
| 2,147,200 | 2/1939 | Kadenacy | 60/314 |
| 2,295,436 | 9/1942 | Tendler | 60/305 |
| 2,450,212 | 9/1948 | Thomas | 181/43 |
| 2,595,932 | 5/1952 | Eichelberg | 60/314 |
| 2,766,742 | 10/1956 | Dolza | 60/317 |
| 2,864,235 | 12/1958 | Paris | 60/278 |
| 3,413,803 | 12/1968 | Rosenlund | 60/274 |
| 3,468,124 | 9/1969 | Hraboweckyj | 60/305 |
| 3,579,981 | 5/1971 | Gau | 60/279 |
| 3,587,541 | 6/1971 | Sarto | 60/278 |
| 3,653,212 | 4/1972 | Gast | 60/293 |
| 3,722,493 | 3/1973 | Hartmann | 60/293 |
| 3,776,364 | 12/1973 | Van Doeren | 181/43 |
| 3,844,260 | 10/1974 | Scott | 123/119 A |

*Primary Examiner*—Douglas Hart
*Attorney, Agent, or Firm*—Flehr, Hohbach, Test, Albritton & Herbert

[57] ABSTRACT

Exhaust system for an internal combustion engine with wall means forming a wave tube having a substantially unimpeded flow passage with one end adapted to be placed in communication with the exhaust opening of the internal combustion engine. The wall means forming a wave tube is formed with a slot in relatively close proximity to the exhaust opening. Means is provided for collecting gases passing through the slot and for supplying the same to the intake of the internal combustion engine. Collecting means is provided for collecting the exhaust gases passing through the wave tube and for maintaining them at an elevated temperature before they are exhausted to the atmosphere.

14 Claims, 4 Drawing Figures

EXHAUST SYSTEM AND METHOD

BACKGROUND OF THE INVENTION

At the present time, much work is being done to provide exhaust systems for automobiles which will meet certain environmental requirements. Such provisional exhaust systems are relatively complicated and expensive. There is, therefore, a need for a new and improved exhaust system and method which will meet the proposed environmental requirements.

SUMMARY OF THE INVENTION AND OBJECTS

The exhaust system is for use with an internal combustion engine having at least one combustion chamber which is adapted to be placed in communication with an exhaust opening by the operation of an exhaust valve and an intake opening by operation of an intake valve. Wall means is provided which forms a wave tube having a substantially unimpeded flow passage with one end adapted to be placed in communication with the exhaust opening of the internal combustion engine. The wall means forming the wave tube is formed with a slot. Means is provided for receiving the gases passing through the slot and for supplying them to the intake opening. Collecting means is connected to the other end of the wall means and is provided for collecting the exhaust gases passing through the wave tube. Means is provided for maintaining the collecting means at an elevated temperature. Means is coupled to the collector means for exhausting the exhaust gases to the atmosphere.

In general, it is an object of the present invention to provide an exhaust system and method which is particularly adaptable for use with internal combustion engines for reducing certain undesirable emissions from the exhaust gases.

Another object of the invention is to provide a system and method of the above character which provides uniform scavenging of each cylinder of an internal combustion engine during the exhaust period for maximum volumetric efficiency and carburetion metering accuracy over the entire operating range of the engine.

Another object of the invention is to provide a system and method of the above character to provide an optimum amount of air injection into the exhaust system for the oxidation of carbon monoxide and unburned hydrocarbons.

Another object of the invention is to provide a system and method of the above character to provide a controlled amount of exhaust gas recirculation to the intake air for the internal combustion engine.

Another object of the invention is to provide a system and method of the above character in which the exhaust temperature is raised for increased oxidation of carbon monoxide and unburned hydrocarbons.

Another object of the invention is to provide a system and method of the above character which is relatively simple.

Another object of the invention is to provide a system and method of the above character which can be utilized on original equipment and which also can be utilized for retrofitting existing equipment.

Another object of the invention is to provide a system and method of the above character which is relatively inexpensive.

Another object of the invention is to provide a system and method of the above character which does not require the use of moving parts.

Another object of the invention is to provide a system and method of the above character which requires little or no maintenance during the operating lifetime of the internal combustion engine.

Additional objects and features of the invention will appear from the following description in which the preferred embodiments are set forth in detail in conjunction with the accompanying drawings.

DESCRIPTION OF PREFERRED EMBODIMENTS

Figure 1:
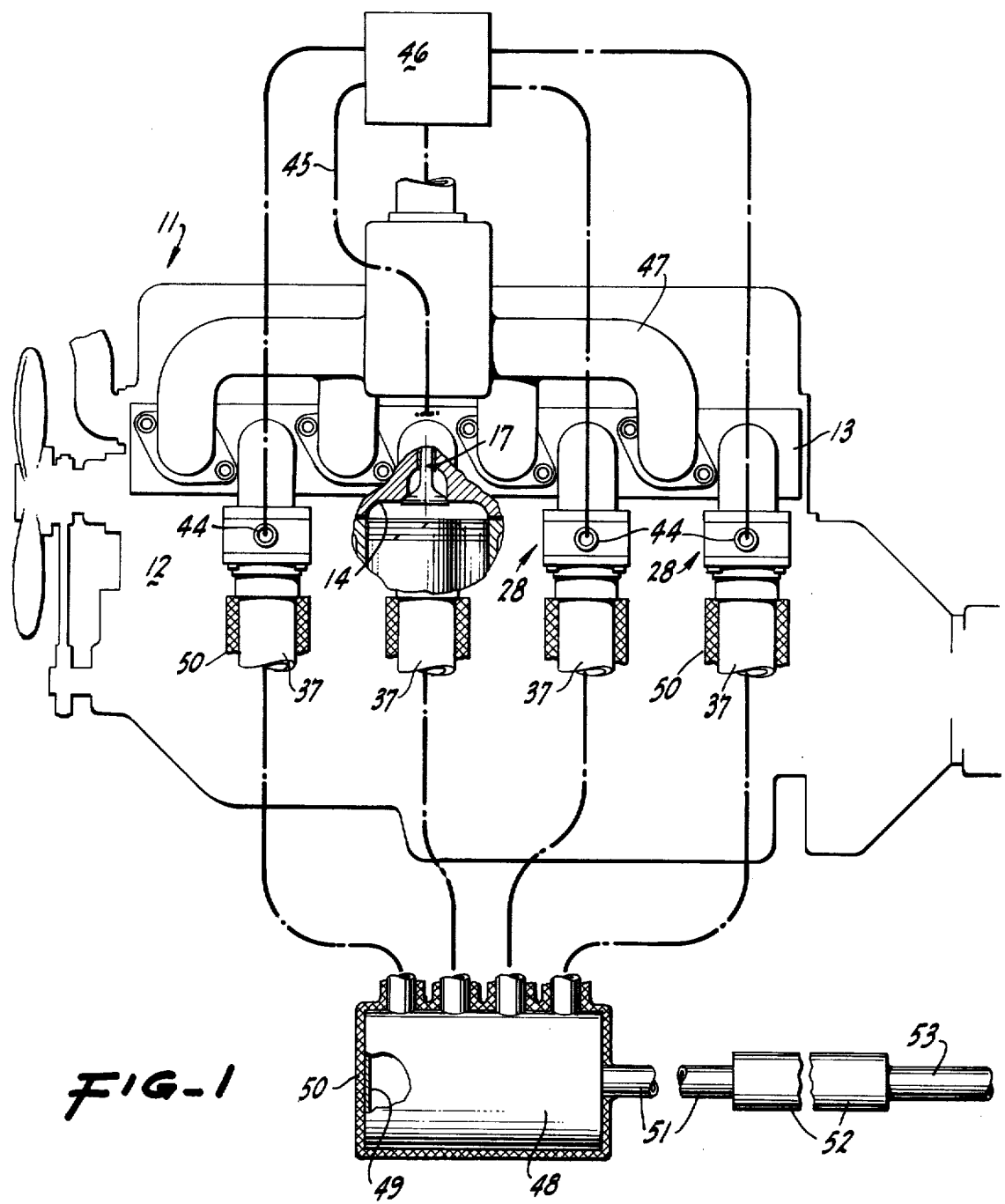
FIG. 1 is a side elevational view, partly in cross-section, of an internal combustion engine having mounted thereon an exhaust system incorporating the present invention.
Figure 2:
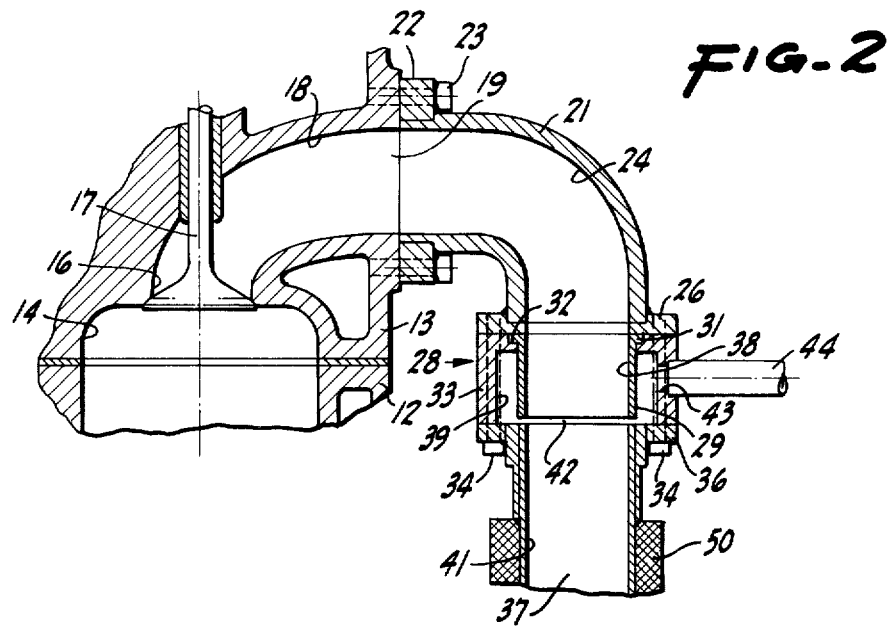
FIG. 2 is a cross-sectional view of one of the cylinders of the internal combustion engine shown in FIG. 1 with the exhaust system mounted thereon.

In FIG. 1, there is shown an internal combustion engine 11 which is generally of a conventional type. It is provided with a block 12 and a head 13 in which there are formed a plurality of combustion chambers 14 having pistons (not shown) slidably mounted therein for reciprocating movement. As detailed in FIG. 2, each combustion chamber 14 is provided with an exhaust opening 16 and also an intake opening (not shown). The exhaust opening is adapted to be closed by an exhaust valve 17 slidably movable between open and closed positions with respect to the opening 16. Similarly, another valve (not shown) is provided for opening and closing the intake opening. The exhaust passage 18 opens through an exhaust port 19. The portion of the internal combustion engine thus far described is conventional.

The exhaust system of the present invention which is mounted on the internal combustion engine 11 consists of a 90° elbow 21 (FIG. 2) which is provided with a flange 22 adapted to be secured to the head 13 of the internal combustion engine by suitable means such as cap screws 23. The flange 22 is secured to the elbow 21 by suitable means such as welding. The elbow 21 is provided with a flow passage 24 which is in communication with the exhaust port 19. The elbow 21 is also provided with a flange 26 on its other end which is secured thereto by suitable means such as welding.

A resistor block assembly 28 is secured to the flange 26. The resistor block assembly consists of a cylindrical sleeve 29 of a suitable size as, for example, 1-½ inches in inside diameter. The sleeve 29 is provided with a flange 31 at its upper end which is engaged by a shoulder carried by a housing 33 that is, by way of example, 2-¼ inches square in cross-section in its outer dimension. The housing 33 is fastened to the flange 26 by suitable means such as screws 34 which extend through a flange 36 provided on the primary pipe 37. The sleeve 29 is provided with a flow passage 38 which is the same size as flow passage 24 and is in communication with the flow passage 24 at the elbow 21. The housing 33 is provided with an annular space 39 which extends around the sleeve 29. The primary pipe 37 is provided with a passage 41 which is approximately the same size as the passage 38 and is adapted to receive exhaust gases from the sleeve 29. A resistor or terminating slot 42 is formed between the flow passage 38 and the flow passage 41 and is provided by having the sleeve 29 terminate short of the flange 36 and the upper extremity of the primary pipe 37 as shown particularly in FIG. 2. The slot 42 is in communication with the space 39 within the housing 33. The housing 33 is provided with a bore 43 in communication with the space 39 extending radially of the housing and which has a pipe 44 mounted therein and connected by secondary piping 45 (FIG. 1) to an air chamber 46 of the type shown in copending application Ser. No. 268,736, filed July 3, 1972. As can be seen from FIG. 1, the internal combustion engine is provided with a plurality of combustion chambers and exhaust systems which are connected by secondary piping 45 into the air chamber 46 for a purpose hereinafter described. The air chamber 46 is connected to the intake system 47 of the internal combustion engine which, in turn, is in communication with intake flow passages for the combustion chambers under the control of the intake valves.

The primary exhaust pipe 37 for each of the combustion chambers of the internal combustion engine is connected into a housing or box 48 which can be identified as a collector. The collector 48 is provided with an inner chamber 49 having a volume of a predetermined size as hereinafter described. The primary pipes 37 and the collector 48 itself are provided with suitable insulation 50 as, for example, fiberglass, so that they are thermally insulated to maintain a high temperature within the primary pipes and the collector 48. A conventional exhaust silencing system is connected to the collector 48 and consists of an exhaust pipe 51 mounted in one wall of the collector 48 and having a muffler 52 of a conventional type mounted thereon. A tail pipe 53 is mounted on the muffler.

From the foregoing, it can be seen that the construction shown serves as wall means which forms a wave tube having a substantially unimpeded flow passage with one end being adapted to be placed in communication with the exhaust port 19. This wall means is provided with a slot 42 in relatively close proximity to the exhaust port 19.

Figure 4:
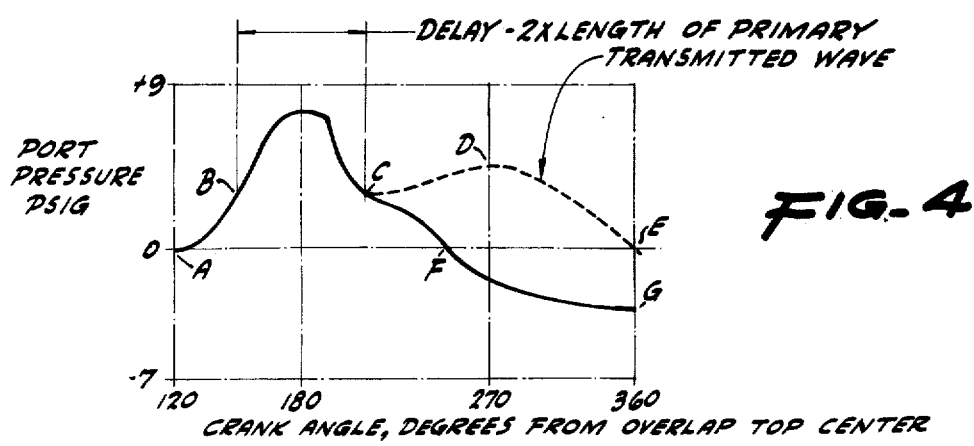
FIG. 4 is a graph showing the transmitted wave and the resultant wave in an exhaust system incorporating the present invention.

Operation and use of the exhaust system in conjunction with an internal combustion engine may now be briefly described as follows in conjunction with FIG. 4. Curve A, B, C, D, E in FIG. 4 is the transmitted pressure wave which would appear at the exhaust port 19 with an infinitely long primary pipe 37. Curve A, B, C, F, G in FIG. 4 is the resultant pressure wave at the exhaust port 19 for a primary pipe 37 of optimum length at nearly full power output for the engine.

Let it be assumed that the internal combustion engine is operating in a manner well known to those skilled in the art. As soon as the exhaust valve 17 opens, a relatively high pressure pulse A, B, C, F, appears in the primary pipe 37 which forces a quantity of relatively clean exhaust gases out through the slot 42 into the space 39 and thence out the pipe 44 to the secondary piping 45 and into the air chamber 46. Because of this high pressure pulse, the diffusion of these exhaust gases into the intake air chamber 46 is relatively rapid. At the time when the exhaust valve first opens, the pressure within the combustion chamber is on the order of 100 lbs. per square inch and the peak primary pipe pressure is on the order of 1 – 10 lbs. per square inch, depending on engine speed and load. These initial exhaust gases are relatively clean because they come from the center of the combustion chamber rather than from the wall of the combustion chamber where the unburned hydrocarbons, and to some extent the carbon monoxide, concentrate. By utilizing the high pressure pulse to cause these initial exhaust gases to be introduced into the air chamber 46 and into the intake system 47, there is proportional exhaust gas recirculation which is quite effective in reducing the oxides of nitrogen pollutants released to the atmosphere by the exhaust system. It is known to those skilled in the art that the desirable percentage of recirculation of exhaust gases ranges from 5 to 30% depending on the engine operating parameters. Flame temperatures increase in the internal combustion engine with increased speed of operation, increasing the content of oxides of nitrogen formed in the combustion chamber, but the exhaust pressure and therefore the amount of exhaust gases recirculated is also increased to thereby reduce the amount of such oxides of nitrogen in the exhaust gases which are finally exhausted to the atmosphere.

The size of the slot 42 in the resistor block assembly controls the rate of recirculation. The secondary pipe should be connected downstream of the resistor block because there will be far too much recirculation if it is connected upstream of the resistor block assembly 28.

After the high pressure pulse represented by the curve A, B, C, F has elapsed and the curve has passed through the zero pressure point and has moved into the negative pressure region as represented by the curve F, G, atmospheric air is drawn in through the slot 42. Since this atmospheric air contains oxygen, this air aids in combusting the unburned hydrocarbons and also for converting carbon monoxide into carbon dioxide. This oxidation of the unburned hydrocarbons and the conversion of the carbon monoxide to carbon dioxide is also facilitated by the fact that the primary pipes 37 and the collector 48 are maintained at a high temperature as, for example, a temperature ranging from 950° to 1000°C. because of the thermal insulation provided on the primary pipes and the collector. The introduction of the atmospheric air and the maintenance of the high temperature is particularly efficacious in reducing the pollutants which are introduced into the air by the internal combustion engine because it is those products which are exhausted from the combustion chamber during the second portion of the exhaust period that contain the major portion of the carbon monoxide and unburned hydrocarbons. By way of example, it has been found that by the use of the slot 42 atmospheric air is injected into the exhaust gases in a percentage ranging from 10 to 30%, and preferably around 18%.

The slot 42 is designed to provide critical damping of the pressure wave in the primary pipe 37, that is, the viscous acoustical resistance is substantially equal to the surge impedance of the primary pipe. This damping prevents subsequent reflections of the exhaust pressure wave so that the combustion chamber is returned to a uniform pressure close to atmospheric before the beginning of the next engine cycle, over the entire operating speed range of the engine, and therefore provides uniform scavenging efficiency and carburetion metering accuracy.

By way of example, it has been found that any slot width above 0.020 inch is not as satisfactory as a narrower slot because it is necessary to rely upon the viscosity of the gas in the slot to absorb excess acoustical energy, which increases the scavenging efficiency of the engine. Since this acoustical resistance varies inversely as the cube of the slot width normal to the flow direction, it was found that in going above 0.020 inch, the reactive part of the impedance becomes appreciable and, therefore, there is no net gain. On one particular engine, it was found that there was no change in the exhaust pressure pulse in increasing the slot width from 0.014 to 0.020 inch, indicating that a slot width of 0.014 inch was enough to critically damp the system.

By way of example, the length of the primary pipes 37 is determined by the formula $$L \text{ (in cm.)} = 1.4 \, (\pm 10\%) \times 10^4 \, \sqrt{T/N}$$

where $n$ = maximum power engine speed (revolutions/min.)
$T$ = absolute expected mean operating temperature in main pipe (K°), and inside diameter $$D \text{ (in cm.)} = 2.8 \times 10^{-3} \times \sqrt{VNe}$$

where $V$ = displacement volume of one combustion chamber (cm$^3$)
$e$ = fractional volumetric efficiency of engine at maximum power engine speed.

The principal reason for utilizing the above identified calculations with respect to length and diameter of the main pipe 37 is to make it possible to adjust the pressure range and the duration so that excessive back pressure is not created which would restrict the performance of the internal combustion engine at the upper speed range and so that the back pressure does not fall too low at the lower end of the speed range.

The collector 48 should have an internal volume of approximately 12 to 20 times the volume of the combustion chamber as, for example, preferably 15 times. Such a collector may serve up to four main primary pipes 37 in a multi-cylinder installation as shown in FIG. 1.

In other words, the high pressure pulse hereinbefore described travels down the primary pipe 37 to the end where it terminates in the collector 48 and is reflected back. The exhaust port 19 to which the primary pipe 37 is connected does not yet know that the primary pipe is not infinitely long and, therefore, maintains a positive pressure for the time it takes the pressure pulse, travelling at the speed of sound which is proportional to the square root of the temperature, to travel all the way down the primary pipe to the collector and then to return back to the exhaust port. During this time, gases are being forced out of the slot 42 into the secondary pipe 45 and into the intake system. As soon as the reflected wave has returned, the pressure at the exhaust port will go negative throughout the remainder of the exhaust period of the internal combustion engine after the initial high pressure pulse has been dissipated.

The dimensions of the secondary pipes 45 are not critical as long as the pressure drop in these pipes is small to 20% of the total exhaust flow rate averaged over the engine cycle. It should be appreciated that where exhaust gas recirculation is not desired, the secondary pipes 45 can be connected directly into the collector 48.

In conjunction with exhaust silencing, it has been found that the provision of the resistor slot 42 substantially reduces the exhaust sounds and particularly the fairly low frequency sounds. Thus, by providing the resistor slots, it has been found that there is a marked reduction in low frequency resonance and, therefore, greatly reduces the silencing requirements for the exhaust system.

Figure 3:
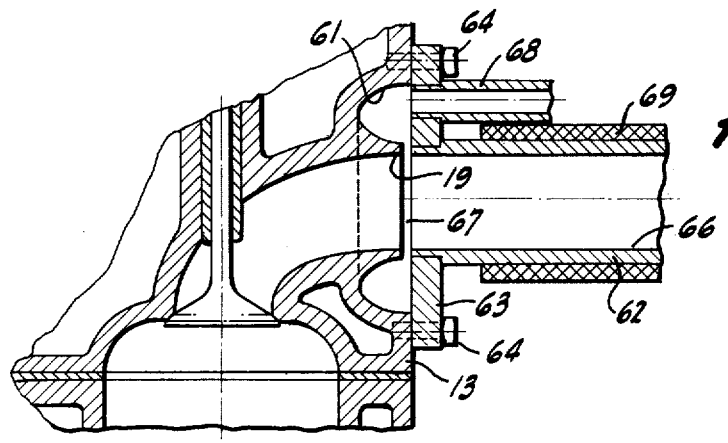
FIG. 3 is a cross-sectional view similar to FIG. 2 but showing another embodiment of an exhaust system incorporating the present invention adapted for use with original equipment.

In conjunction with the foregoing, it can be seen that the exhaust system herein disclosed is particularly adapted for retro-fitting existing internal combustion engines. When it is desired to utilize such an exhaust system with a factory built internal combustion engine, the exhaust system can be greatly simplified. By way of example, as shown in FIG. 3, the head 13 can be provided with an annular slot 61 which surrounds the exhaust port 19. A primary pipe 62 provided with a flange 63 welded thereto is secured to the head 13 by cap screws 64. The primary pipe 62 is provided with a flow passage 66 which is in registration with the exhaust port; however, as shown in FIG. 3, the head 13 is formed in such a manner that the exhaust port terminates just short of the innermost extremity of the primary pipe 62 so that there is provided an annular slot 67 therebetween which opens into the annular recess 61. A secondary pipe 68 is threaded into the flange 63 and is in communication with the annular recess 61 as shown in FIG. 3. The primary pipe 62 is provided with insulation 69 and is connected into a collector 48 of the type hereinbefore described. The secondary piping 68 is connected into an air chamber 46 of the type hereinbefore described.

Operation of this embodiment of the invention is substantially identical to that hereinbefore described. As pointed out previously, upon opening of the exhaust valve, a high pressure pulse is produced which causes exhaust gas to pass through the slot 67 into the secondary piping 68 where it is recirculated into the intake system of the engine. This high pressure pulse continues until the wave is reflected back, at which time there is negative pressure which causes the remaining gases within the combustion chamber to be scavenged out of the combustion chamber, after which the exhaust valve closes to start another cycle.

From the foregoing, it can be seen that there has been provided a new and improved exhaust system for use with internal combustion engines which has a great number of advantages. As pointed out previously, it is possible to provide uniform scavenging of each cylinder of the internal combustion engine during the exhaust period for maximum volumetric efficiency and carburetion metering accuracy over the entire operating speed range of the engine. The amount of pollutants which are produced by the internal combustion engine is greatly reduced by injecting the optimum amount of air into the exhaust system and by maintaining an elevated exhaust temperature with an increased residence time for the exhaust gases to greatly increase oxidation of the carbon monoxide and the unburned hydrocarbons. In addition, the oxides of nitrogen are also greatly reduced by recirculating the initial portion of the exhaust gases into the intake system of the internal combustion engine. In addition, the exhaust system is one which is relatively simple and inexpensive, has no moving parts and is, therefore, relatively maintenance free.

I claim:

1. In an exhaust system for an internal combustion engine having at least one combustion chamber which is adapted to be placed in controlled communication with an exhaust opening for discharging exhaust gas from the combustion chamber during an exhaust period and with an intake opening for inducting an intake mixture into the combustion chamber during an intake period, wall means forming a wave tube having first and second open ends with the first end being adapted to be placed in communication with and in close proximity to said exhaust opening, said wall means being free of converging portions as viewed from said first end, said wave tube being formed with slot means establishing continuous communication between the interior of said wave tube and a source of atmospheric pressure air, said wall means including primary pipe means having a significant length extending beyond said slot means and being free of substantial abrupt changes in sectional area between said slot means and said second end of the wave tube whereby upon discharge of exhaust gas from the combustion chamber a pressure wave is produced within the wave tube to cause a portion of the exhaust gas to escape from the wave tube through the slot means until a reflected wave produced by said pressure wave at said second end creates a depression within the wave tube to cause atmospheric air to enter the wave tube through the slot means whereby the wave tube forms a mixing space for the exhaust gas and the air which enters the wave tube for combusting unburned hydrocarbons and for converting carbon monoxide to carbon dioxide, said slot means being sized to absorb substantially all of the energy of said reflected wave for preventing the production of more than one significant pressure wave for each exhaust period.

2. A system as in claim 1 together with an exhaust collector coupled to the second end of said wave tube, said exhaust collector having an internal volume which is substantially greater than the internal volume of said one combustion chamber.

3. An exhaust system in claim 2 wherein said primary pipe means and said exhaust collector are thermally insulated to maintain the gases therein at a high temperature.

4. An exhaust system as in claim 1 wherein said primary pipe has an approximate length determined by the formula $$L \text{ (in cm)} = 1.4 \ (\pm 10\%) \times 10^4 \times \sqrt{T/N}$$

where
$N$ = maximum power engine speed (revolutions/min.)
$T$ = expected mean operating temperature in main pipe (K°) and has an approximate inside diameter as determined by the formula $$D \text{ (in cm)} = 2.8 \times 10^{-3} \times \sqrt{Ve}$$

where
$V$ = displacement volume of one combustion chamber (cm³)
$e$ = fractional volumetric efficiency of engine at maximum power engine speed.

5. An exhaust system as in claim 2 together with exhaust silencing means connected to the exhaust collector.

6. An exhaust system as in claim 5 together with means for collecting the exhaust gas escaping through said slot means and for supplying the same to the intake opening.

7. An exhaust system as in claim 1 wherein said slot means extends in a plane which is substantially perpendicular to the axis of the flow passage in the wave tube at the location of said slot means.

8. In a method for controlling the pollutants released to the atmosphere by an internal combustion engine having at least one combustion chamber which is adapted to be placed in controlled communication with an exhaust opening during an exhaust period and with an intake opening during an intake period, providing exhaust piping connected to the exhaust opening free of converging portions as viewed from the exhaust opening, providing at least one slot in said piping in a position wherein the exhaust piping has a substantial length extending beyond the slot, discharging exhaust gas during the exhaust period, propagating a pressure wave through the exhaust gas outwardly from the exhaust opening, propagating a reflected wave through the exhaust gas inwardly toward the exhaust opening, utilizing the slot to permit a portion of the exhaust gas to escape therethrough during the first portion of the exhaust period and to permit atmospheric air to enter therethrough during the second portion of the exhaust period and to substantially attenuate the reflected wave so that only one significant pressure wave in the exhaust gas occurs for each exhaust period, and using the exhaust piping as a mixing space for the exhaust gas and atmospheric air and as a combusting space for combusting unburned hydrocarbons in the exhaust gas and for converting carbon monoxide in the exhaust gas to carbon dioxide.

9. A method as in claim 8 together with the step of collecting the mixture of exhaust gas and atmospheric air and maintaining said mixture at a relatively high temperature for a substantial period of time to enhance the combustion of unburned hydrocarbons and the conversion of carbon monoxide to carbon dioxide.

10. A method as in claim 9 together with the step of collecting the exhaust gas which escapes through said slot and recirculating such exhaust gas into the intake opening to reduce the oxides of nitrogen.

11. In a method for controlling the pollutants released to the atmosphere by an internal combustion engine having at least one combustion chamber which is adapted to be placed in controlled communication with an exhaust opening during an exhaust period and an intake opening during an intake period, discharging exhaust gas from the exhaust opening during the exhaust period, propagating a pressure wave in the exhaust gas outwardly from the exhaust opening, propagating a reflected wave in the exhaust gas inwardly toward the exhaust opening and substantially attenuating the reflected wave in the exhaust gas so that only one significant pressure wave in the exhaust gas occurs for each exhaust period and introducing atmospheric air into the exhaust gas only during the latter portion of the exhaust period for combusting unburned hydrocarbons and for converting carbon monoxide to carbon dioxide in a space exterior of the combustion chamber.

12. A method as in claim 11 together with the step of collecting at least a portion of the exhaust gas and supplying the same to the intake opening.

13. A method as in claim 12 together with the step of maintaining mixture of exhaust gas and atmospheric air at a relatively high temperature for a substantial period of time to oxidize the carbon monoxide and unburned hydrocarbons in the exhaust gas.

14. An exhaust system as in claim 6 which is free of moving parts.

* * * * *

UNITED STATES PATENT AND TRADEMARK OFFICE
CERTIFICATE OF CORRECTION

PATENT NO. : 3,946,558
DATED : March 30, 1976
INVENTOR(S) : William H. Beekhuis, Jr.

It is certified that error appears in the above-identified patent and that said Letters Patent are hereby corrected as shown below:

In the specification:

Column 5, line 17  Delete "$L \text{ (in cm.)} = 1.4 \ (\pm 10\%) \times 10^4 \sqrt{T/N}$ and substitute therefor --$L \text{ (in cm.)} = 1.4 \ (\pm 10\%) \times 10^4 \sqrt[4]{T} / N$--

Column 5, line 21  Delete "n" and substitute therefor --N--

Column 7, line 47  Delete "$L \text{ (in cm.)} = 1.4 \ (\pm 10\%) \times 10^4 \sqrt{T/N}$ and substitute therefor --$L \text{(in cm.)} = 1.4 \ (\pm 10\%) \times 10^4 \sqrt[4]{T} / N$--

In the drawings:

In the label for the abcissa of Fig. 4 cancel "overlap" and substitute therefor --combustion--

Signed and Sealed this

Thirtieth Day of November 1976

[SEAL]

Attest:

RUTH C. MASON
*Attesting Officer*

C. MARSHALL DANN
*Commissioner of Patents and Trademarks*